Dec. 20, 1955 N. C. FULMER 2,727,941

COLOR TELEVISION SYSTEM

Filed Sept. 26, 1951 2 Sheets-Sheet 1

INVENTOR.
NORMAN C. FULMER

BY Darby & Darby

ATTORNEYS

Dec. 20, 1955 N. C. FULMER 2,727,941

COLOR TELEVISION SYSTEM

Filed Sept. 26, 1951 2 Sheets-Sheet 2

| SCANNING LINE | FIELD NUMBER 1 | 2 | 3 | 4 | 5 | 6 | 7 | 8 | 9 |
|---|---|---|---|---|---|---|---|---|---|
| 31 | R | | | B | | | G | | |
| 32 | | G | | | R | | | B | |
| 33 | | | B | | | G | | | R |
| 34 | G | | | R | | | B | | |
| 35 | | B | | | G | | | R | |
| 36 | | | R | | | B | | | G |
| 37 | B | | | G | | | R | | |
| 38 | | R | | | B | | | G | |
| 39 | | | G | | | R | | | B |

*INVENTOR.*
NORMAN C. FULMER

*BY* Darby & Darby

ATTORNEYS 2,727,941

COLOR TELEVISION SYSTEM

Norman C. Fulmer, Montclair, N. J., assignor to Allen B. Du Mont Laboratories, Inc., Clifton, N. J., a corporation of Delaware Application September 26, 1951, Serial No. 248,326

3 Claims. (Cl. 178—5.4)

This invention relates to color television and more particularly to a system wherein the television image is colored by means of color filters placed in front of the image.

An object of the invention is to provide a color television system wherein the coloring is selectively predetermined at the transmitter.

Another object is to provide a color television system which eliminates the necessity for color registry devices in a receiver.

A further object is to provide a color television system that is versatile, so that color sequence can be changed at will at the transmitter and the receiver system will automatically provide properly colored pictures; either line-sequential or field-sequential coloring may be employed at will.

A still further object is to provide a color television system of line-sequential coloring wherein each line can sequentially represent all colors, whereby color mixing is achieved.

Yet another object is to provide a color television system wherein color definition is improved.

Other objects will be apparent.

Figures 1, 2, 3:
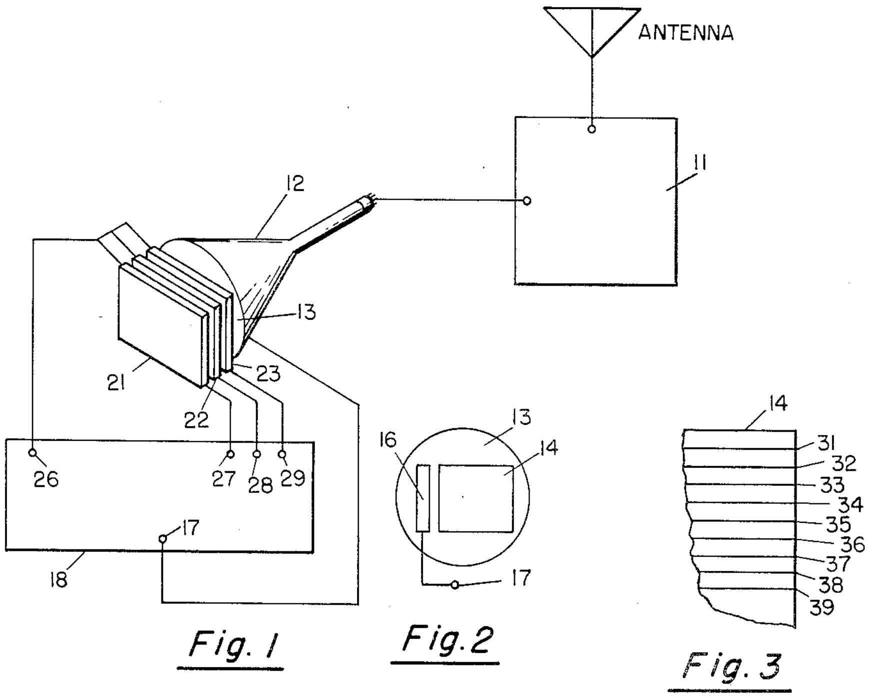
Fig. 1 shows an arrangement of a television receiver in diagrammatic form, embodying the present invention.
Fig. 2 is a front elevational view of the picture screen of the receiver of Fig. 1.
Fig. 3 is an enlarged view of a portion of the picture screen shown in Fig. 1.

Referring to Fig. 1, normal and well known television receiver circuits 11 are connected to a cathode ray picture tube 12 having a picture screen 13 which comprises a picture area 14. For clarity, another view of the screen appears in Fig. 2. Adjacent the left edge of the area 14 is a signal pick-up strip 16 which extends along the entire height of the area 14 within the tube 12. The pick-up strip 16 is constructed from conductive material and is electrically connected to a terminal 17 of a color-actuating circuit 18.

Three color filters 21, 22 and 23 are arranged in parallel alignment in front of the picture screen 13. These filters are of an electro-optical type which may be made transparent or colored at will, by means of electrical voltages. The filters are shown in combination with a preferred electrical connection wherein a terminal of each filter is connected, in common, to a terminal 26 of the color-actuating circuit 18, and a remaining terminal of each of the filters 21, 22, 23 is connected individually to terminals 27, 28, 29 of the circuit 18. The electro-optical filters 21, 22, 23 may be of a type known in the art as "P–N crystals," "Kerr cells," or ammonium di-hydrogen phosphate crystals.

In the portion shown in Fig. 3 of the picture area 14, lines 31, 32, 33, 34, 35, 36, 37, 38, 39 are shown which represent positions, at successive times, of the horizontal scanning lines of the electron beam in the tube 12 on the picture area 14.

Figure 4:
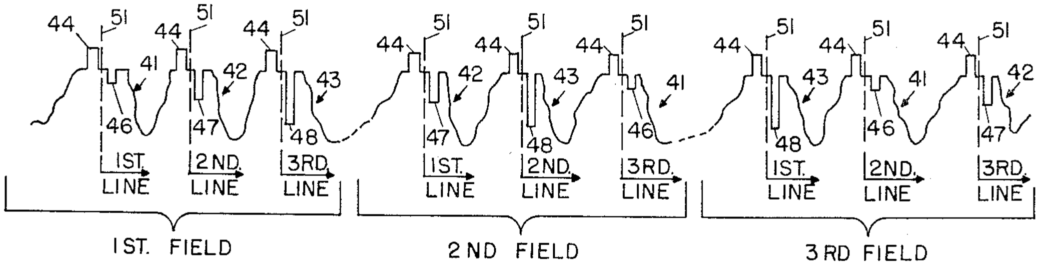
Figs. 4, 5 and 6 show alternative types of preferred television signals which are used in the system.

In the signal illustrated in Fig. 4, representative signals are shown for each of three consecutive picture fields. In the signal for each field, there is shown a video signal 41 which represents a single line scansion of a single color which may be, e. g., red; a second line scansion video portion 42 represents a different color, which may be, e. g., green; and a third video portion 43 represents a single line scansion of still another color which may be, e. g., blue. Preceding each line-scansion portion of the signal, there is a line-synchronizing pulse 44.

Immediately preceding each line scansion portion and interspersed therebetween and each corresponding synchronizing pulse, there is a color-coding pulse. A red-coded pulse 46 precedes each red-representative line scansion 41. A green-coded pulse 47 precedes each green-representative line scansion signal 42. A blue-coded pulse 48 precedes each blue representative line scansion 43. Vertical dotted lines 51 represent the beginning of each line swept by the electron beam. The color-coding pulses 46, 47 and 48 are positioned in the signal so that, when such pulses occur, the electron beam will fall upon the pick-up strip 16, which strip picks up the color-coded pulses and applies them to the terminal 17.

The color-pulse-coding system shown in Fig. 4 comprises pulses of different amplitudes, the red pulses 46 being distinguished by having relatively short amplitudes, the green pulses 47 being distinguished by having intermediate amplitudes, and the blue pulses 48 being distinguished by having the greatest amplitudes. Although shown as extending negatively, the color-coded pulses may also extend positively. In each of the three fields represented in the signals of Fig. 4, each shows three line scansions corresponding to the same three lines swept by the cathode ray beam. These three lines may be, for example, the lines 31, 32 and 33 shown in Fig. 3. Thus, in the first field, line 31 represents red, line 32 represents green, and line 33 represents blue. In the second field, line 31 represents green, line 32 represents blue, and line 33 represents red. In the third field, line 31 represents blue, line 32 represents red, and line 33 represents green.

Figure 5:
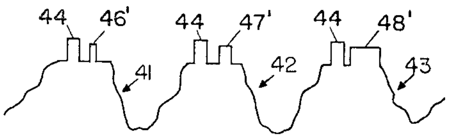

The alternative signal shown in Fig. 5 is similar to that of Fig. 4; a signal is shown representing a single field having line scansion portions 41, 42 and 43; line synchronizing pulses 44; and color coding pulses 46', 47' and 48'. The color coding pulses 46', 47' and 48' are, in this instance, shown as comprising width-modulated pulses, one of which, for instance that identified as 46', has a narrow width and represents the red-coded pulse; 47' is of medium width and represents a green-coded pulse, and 48' has the widest width and represents a blue-coded pulse. Although these color-coded pulses are shown to extend positively, they may, instead, extend negatively.

Figure 6:
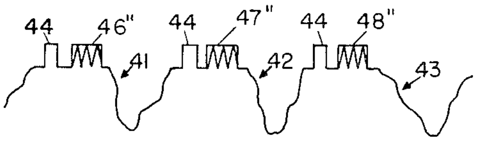

Fig. 6 shows an alternative type of color-coded pulses 46'', 47'' and 48''. The color coded pulses are distinguished, in this embodiment, by containing a burst of alternating frequency electrical energy having a frequency which differs in accordance with different colors represented. The frequencies contained in each pulse should be high enough so that several alternations of the energy occur during each pulse. One color coded pulse, for example 46'', may contain a relatively low frequency so as to represent red; another color-coded pulse 47'' may contain an intermediate frequency, and thus represent green; a third color-coded pulse 48″ may contain a relatively high frequency and thus represent blue.

The signals shown in Figs. 4, 5, 6 are produced in a transmitter, using well-known techniques, and are reproduced in the receiver circuits 11.

Figures 7, 8:
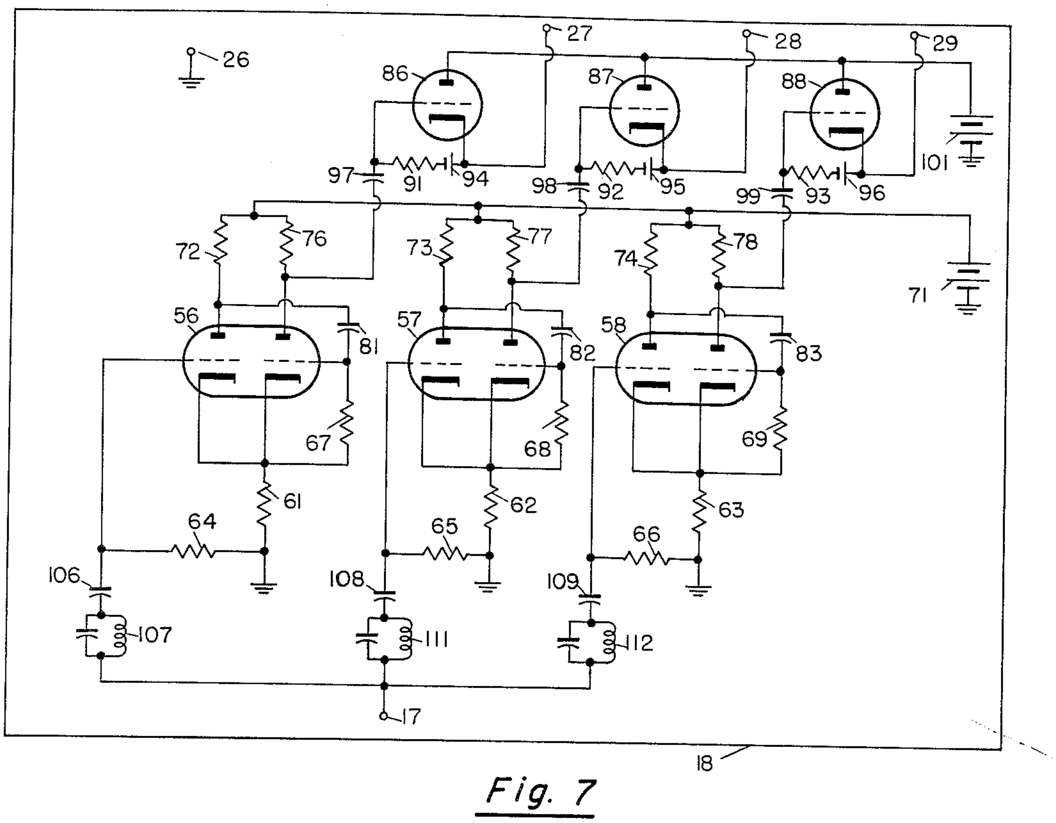
Fig. 7 is a schematic electrical diagram of circuits useful in the arrangement of Fig. 1.
Fig. 8 shows, in tabulated form, a preferred arrangement of colored interlaced scanning.

Now referring to Fig. 7, a preferred schematic electrical circuit is shown for the color actuating circuit 18 for use with a signal of the type shown in Fig. 6 wherein the color-coding pulses contain differing frequencies. Dual triode tubes 56, 57, and 58 each have their cathodes grounded through bias resistances 61, 62 and 63. Each tube has a first grid grounded through a resistance 64, 65, and 66. Each tube has a second grid connected to its cathode through a resistance 67, 68 and 69. Each tube has a first anode connected to a voltage source 71 through a resistance 72, 73 and 74 and a second anode connected to said source 71 through a resistance 76, 77 and 78. The remaining terminal of the source 71 is grounded. The first anode of each tube is connected to the second grid thereof through a capacitance 81, 82, 83.

Three triode tubes 86, 87, 88 which may be of either vacuum or gas-filled type, have cathodes connected to terminals 27, 28 and 29 respectively. Each tube contains a grid which is connected to its respective cathode through a resistance 91, 92, 93 and bias voltage source 94, 95, 96. The grid of tube 86 is connected through a capacitance 97 to the second anode of the tube 56; the grid of tube 87 is connected through a capacitance 98 to the second anode of the tube 57, the grid of tube 88 is connected through a capacitance 99 to the second anode of the tube 58. The anodes of the tubes 86, 87, 88 are connected together and to a voltage source 101, the remaining terminal of which is grounded. The terminal 26 is grounded. The terminal 17 is connected to the first grid of the tube 56 through an isolating capacitance 106 and a tuned circuit 107 that is tuned to pass only the frequency contained in the color-coding pulse 46″ of Fig. 6. The terminal 17 is also connected to the first grids of the tubes 57 and 58 through isolating capacitances 108 and 109, respectively, and tuned circuits 111 and 112 which are each tuned to pass only one of the color-coded signals 47″ and 48″ respectively.

The tubes 56, 57, 58 are arranged in circuits known as one-shot multivibrators which, when actuated by respective color-coded pulses through selective means which comprises electric filters in the present embodiment, produce at their second anodes a pulse having a predetermined time duration. These pulses, in turn, trigger the respective switching tubes 86, 87, 88 which function to apply voltage from the source 101 to the respective color filters 21, 22, 23 in such a sequence and for such a time duration as to turn on the proper filter for the proper length of time which is, in this case, the time duration of one sweep scansion of the electron beam on the picture area 14. Preferably, only one filter is turned on at one time. Other circuits may be employed by those skilled in the art for use with other types of color-coded pulses such as are indicated in Figs. 4 and 5.

Many combinations of interlaced scanning may be employed in connection with the coloring system herein disclosed; for example, Fig. 8 shows a preferred arrangement employing triple interlaced scanning in connection with the scanning lines shown in Fig. 3. The letter "*r*" represents red color; the letter "*g*" represents green color; the letter "*b*" represents blue color. During the first field, every third line is scanned, viz. lines 31, 34 and 37, each in a different color. During the second and third fields the remaining lines are similarly scanned in different colors. The fields 1, 2 and 3 comprise a complete frame in which adjacent lines are different colors. During the next frame comprising field numbers 4, 5 and 6, each line is colored a different color than in the previous frame. In the third frame, comprising fields 7, 8 and 9, each line is scanned in a still different color. Thus, during the nine fields represented, each line has been scanned once in each of the 3 primary colors in an interlaced manner which aids in reducing flicker effect. The arrangement of the 9 fields represented in Fig. 8 comprises a complete cycle which is consecutively repeated as long as the system is operating.

The system is adaptable for field-sequential color by merely transmitting a signal wherein all of the color-coding pulses during each field are the same color, and all of succeeding fields contain different colors in respective sequential order.

Other types of scanning arrangements may be employed at will, merely by changing the transmitted signal color-coding pulse arrangement. The receiver will automatically follow suit. Unusual effects may be obtained with the invention; for example, the entire picture area may be made a brilliant color hue such as red, by transmitting a signal containing only red color-coding pulses so that all lines will be scanned in a red color.

It will be seen that the novel system eliminates any necessity for color registry at the receiver. If the scansion lines should shift or drift, they will still be represented in the proper color. Color definition is improved over line-sequential systems used heretofore because, in the novel system herein disclosed, each line represents all colors. This may be understood more clearly by referring to Fig. 3 where, in accordance with previous line sequential systems, line 31 would always be red, line 32 would always be green, and line 33 would always be blue. The criterion of color definition then, would be the width of the screen covered by the three lines 31, 32 and 33; with the presently disclosed system, each line, such as line 31, represents all of the three colors; hence, the color definition has been improved because the aforementioned criterion has been reduced to the width of only one line.

To introduce black or gray or white into the picture, one or more of the color-coded pulses may be skipped or eliminated or otherwise be made inoperative, so that none of the filters 21, 22, 23 will be operative during certain scansion lines. For a completely black-and-white or monochrome picture, all of the color-coded pulses are eliminated or made inoperative. Thus, the novel color system is compatible with a monochrome system.

While the invention has been described in a general way and preferred embodiments specifically described, other embodiments and alternatives will be apparent to those skilled in the art. The true scope of the invention is defined by the following claims.

What is claimed is:

1. A color television system comprising a source of signals having a video portion and having a color-coded pulse preceding said video portion, a picture-reproducing tube containing an electron gun producing an electron beam a fluorescent picture screen and an electrically conductive pick-up strip positioned adjacent an edge of said picture screen, said signals being connected to said gun to modulate said electron beam, means to cause said electron beam to scan across said pick-up strip and picture screen whereby said electron beam strikes the pick-up strip during the occurrence of said color-coded pulse and strikes the picture screen during the occurrence of said video portion, an electro-optical filter positioned in front of said picture screen, said filter being normally transparent to all colors and becoming transparent to selected colors only when actuated, an actuating circuit having an input control terminal connected electrically to said pick-up strip and producing at an output terminal thereof an actuating signal in response to said color-coded pulse, said actuating signal having a time duration substantially equal to the time required for said electron beam to scan across said picture screen, and means connecting said actuating signal to said filter.

2. The system in accordance with claim 1, in which said video portion represents modulation for a horizontal line scansion of said electron beam, and said pick-up strip extends vertically adjacent an entire vertical edge of said picture screen, whereby said filter may be actuated regardless of the vertical position of said horizontal line scansion.

3. A color television system comprising a source of signals having a plurality of video portions each representative of a different color and having an alternating current pulse preceding each said video portion, each said pulse having a different frequency of alternation, a cathode ray picture tube connected to display a picture in accordance with the video portions of said signals, said tube comprising an electron gun, a fluorescent screen, and a conductive pickup strip extending parallel to one edge of said screen; deflection means to cause said beam to scan said fluorescent screen during said video portions and to scan said pickup strip during the occurrence of each said pulse; a plurality of electro-optic filters placed in parallel alignment in front of said screen, said filters being characterized by the transmission of light of only selected colors when actuated by high voltage; a high voltage source; a plurality of tuned circuits connected to said strip to receive said pulses; a plurality of actuating means connecting said high voltage source to said filter; and a connection from said tuned circuit to one of said actuating means respectively to operate the proper one of said actuating means in accordance with the frequency of pulse received, whereby said filters are actuated corresponding to the colors represented by said video portions.

References Cited in the file of this patent

UNITED STATES PATENTS

| | | |
|---|---|---|
| 2,378,746 | Beers | June 19, 1945 |
| 2,530,431 | Huffman | Nov. 21, 1950 |
| 2,539,440 | Labin | Jan. 30, 1951 |
| 2,546,972 | Chatterjea | Apr. 3, 1951 |
| 2,586,635 | Fernsler | Feb. 19, 1952 |
| 2,587,074 | Sziklai | Feb. 26, 1952 |
| 2,618,701 | Christensen | Nov. 18, 1952 |
| 2,657,257 | Lesti | Oct. 27, 1953 |